(12) United States Patent
Li et al.

(10) Patent No.: US 12,548,493 B2
(45) Date of Patent: Feb. 10, 2026

(54) DISPLAY CONTROL METHOD AND ELECTRONIC DEVICES THEREOF

(71) Applicant: Lenovo (Beijing) Limited, Beijing (CN)

(72) Inventors: Huaqiao Li, Beijing (CN); Fenglong He, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/964,252

(22) Filed: Nov. 29, 2024

(65) Prior Publication Data
US 2025/0182673 A1 Jun. 5, 2025

(30) Foreign Application Priority Data
Nov. 30, 2023 (CN) ............ 202311635746.5

(51) Int. Cl.
| | |
|---|---|
| G09G 3/20 | (2006.01) |
| G06F 3/14 | (2006.01) |
| H04N 21/41 | (2011.01) |
| H04N 21/4363 | (2011.01) |
| H04W 4/02 | (2018.01) |
| H04W 12/63 | (2021.01) |
| H04W 76/14 | (2018.01) |

(52) U.S. Cl.
CPC ......... *G09G 3/2096* (2013.01); *G06F 3/1438* (2013.01); *G06F 3/1454* (2013.01); *G09G 2356/00* (2013.01); *G09G 2360/04* (2013.01); *G09G 2370/04* (2013.01); *G09G 2370/16* (2013.01); *H04N 21/4122* (2013.01); *H04N 21/43637* (2013.01); *H04W 4/023* (2013.01); *H04W 12/63* (2021.01); *H04W 76/14* (2018.02)

(58) Field of Classification Search
CPC ............ G09G 3/2096; G09G 2356/00; G09G 2360/04; G09G 2370/04; G09G 2370/16; G06F 3/1438; G06F 3/1454; H04W 4/023; H04W 12/63; H04W 76/14; H04N 21/4122; H04N 21/43637
USPC ....................................................... 345/1.1
See application file for complete search history.

(56) References Cited

U.S. PATENT DOCUMENTS

| | | | | |
|---|---|---|---|---|
| 10,127,746 | B2 * | 11/2018 | Bergdale | G07C 9/28 |
| 11,288,028 | B2 * | 3/2022 | Miles | H01R 27/02 |
| 11,349,976 | B2 * | 5/2022 | Zhao | G06F 3/1454 |
| 2013/0210345 | A1 * | 8/2013 | Ling | H04B 5/48 |
| | | | | 455/41.1 |
| 2019/0228348 | A1 * | 7/2019 | O'Keefe-Sally | G06Q 10/02 |
| 2020/0396569 | A1 * | 12/2020 | Shekhar | H04L 67/1046 |
| 2022/0272399 | A1 * | 8/2022 | Zhang | H04M 1/72412 |
| 2022/0279062 | A1 * | 9/2022 | Ye | G01S 5/04 |
| 2023/0021994 | A1 * | 1/2023 | Gu | H04N 21/43615 |

(Continued)

*Primary Examiner* — Tom V Sheng
(74) *Attorney, Agent, or Firm* — ANOVA LAW GROUP, PLLC

(57) ABSTRACT

A display control method applied to a first device includes: determining a first position of the first device, when it is determined that a second device is located within a preset range of the first device and the second device is an associated device of the first device; and sending, when the first position of the first device meets a condition and based on a direct connection channel between the first device and the second device, data of the first device to the second device to display the data on the second device.

18 Claims, 4 Drawing Sheets

Determining a first position of a first device, when it is determined that a second device is located within a preset range of the first device and the second device is an associated device of the first device — S11

Sending data of the first device to the second device based on a direct connection channel between the first device and the second device, so that the second device may display data sent by the first device, when the first position of the first device meets a condition — S12

(56) References Cited

U.S. PATENT DOCUMENTS

| | | | |
|---|---|---|---|
| 2023/0245607 A1* | 8/2023 | Cheon | G09G 5/14 |
| | | | 345/173 |
| 2024/0192912 A1* | 6/2024 | Wang | G06F 3/1454 |
| 2024/0354041 A1* | 10/2024 | Jiang | G06F 3/1423 |

* cited by examiner

Determining a first position of a first device, when it is determined that a second device is located within a preset range of the first device and the second device is an associated device of the first device — S11

Sending data of the first device to the second device based on a direct connection channel between the first device and the second device, so that the second device may display data sent by the first device, when the first position of the first device meets a condition — S12

FIG. 1

Determining a first position of a first device, when it is determined that a second device is located within a preset range of the first device and the second device is an associated device of the first device — S21

Sending data of the first device to the second device based on a direct connection channel between the first device and the second device, thus allowing the second device to display the data sent by the first device, when the first position of the first device meets a condition and a target user matching the first device is detected — S22

FIG. 2

Determining a first position of a first device, when it is determined that a second device is located within a preset range of the first device and the second device is an associated device of the first device — S31

Determining whether the first device is in a target working state, when the first position of the first device meets a condition — S32

Sending data of the first device to the second device based on a direct connection channel between the first device and the second device, thus allowing the second device to display data sent by the first device, when it is determined that the first device is in the target working state — S33

FIG. 3

S41 — Determining a first position of a first device, when it is determined that a second device is located within a preset range of the first device and the second device is an associated device of the first device S42 — Outputting a data screen projection request to the second device, when the first position of the first device meets a condition S43 — Receiving a response result determined by the second device based on multiple data screen projection requests received, where the second device receives data screen projection requests sent from the first device and at least one third device and the second device determines whether to respond to the first device based on historical connection information and/or device priority S44 — Sending data of the first device to the second device based on a direct connection channel between the first device and the second device, thus allowing the second device to display the data sent by the first device, when the response result indicates that the data screen projection request sent from the first device is being responded to

FIG. 4

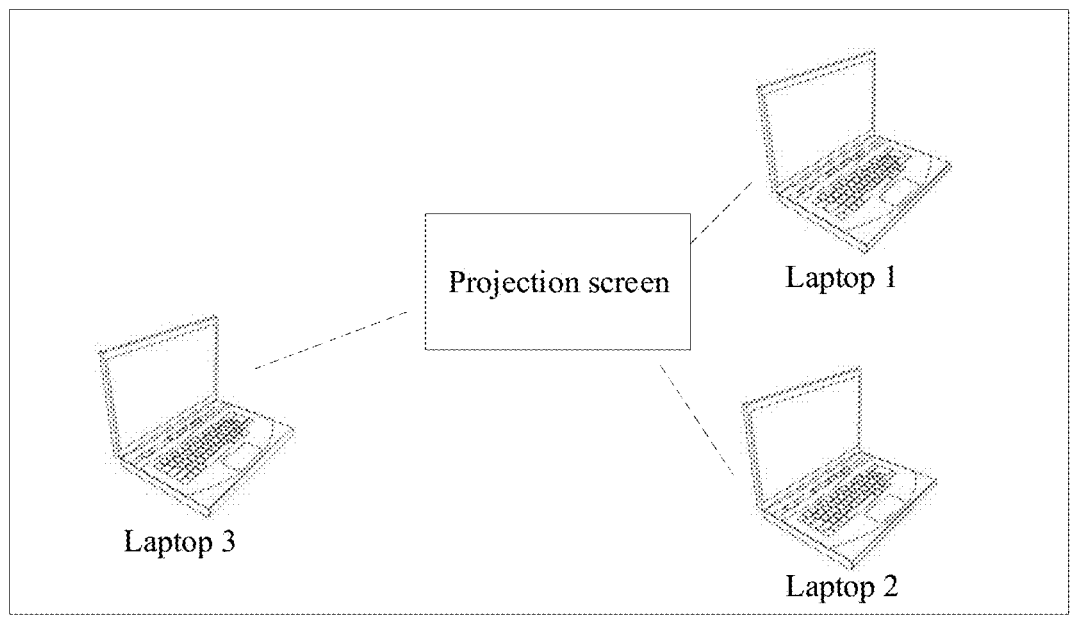

FIG. 5

| Determining a first position of a first device, when it is determined that a second device is located within a preset range of the first device and the second device is an associated device of the first device | S61 |

↓

| Sending data of the first device to the second device based on a direct connection channel between the first device and the second device, thus allowing the second device to display the data sent by the first device, when the first position of the first device meets a condition | S62 |

↓

| Detecting a change in the first position of the first device | S63 |

↓

| Continuing to send the data of the first device to the second device when it is determined that the first position of the first device no longer meets the condition, but the second device is still within the preset range of the first device | S64 |

FIG. 6

| Determining, when it is determined that a first device is within a preset range of the second device and the first device is an associated device of the second device, a first position of the first device | S71 |

↓

| Receiving data sent by the first device based on a direct connection channel between the first device and the second device and displaying the data, when it is determined that the first position of the first device meets a condition | S72 |

FIG. 7

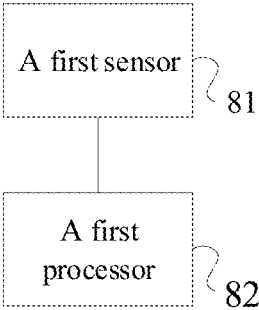

FIG. 8

DISPLAY CONTROL METHOD AND ELECTRONIC DEVICES THEREOF

CROSS-REFERENCES TO RELATED APPLICATIONS

The present disclosure claims priority to Chinese Patent Application No. 202311635746.5, filed on Nov. 30, 2023, the content of which is incorporated herein by reference in its entirety.

TECHNICAL FIELD

The present disclosure relates to the field of data display and, more specifically, relates to a display control method and electronic devices.

BACKGROUND

Currently, manual operations are usually required to project images displayed on a display screen of an electronic device onto to a large-screen device by wireless screen-projection.

SUMMARY

One aspect of the present disclosure provides a display control method applied to a first device. The method includes: determining a first position of the first device, when it is determined that a second device is located within a preset range of the first device and the second device is an associated device of the first device; and sending, when the first position of the first device meets a condition and based on a direct connection channel between the first device and the second device, data of the first device to the second device to display the data on the second device.

Another aspect of the present disclosure provides an electronic device, used as a first device. The first device includes a first sensor, configured to determine a first position of the first device; and a first processor, configured to: determine the first position of the first device through the first sensor, when it is determined that a second device is located within a preset range of the first device and the second device is an associated device of the first device; and send, when the first position of the first device meets a condition and based on a direct connection channel between the first device and the second device, data of the first device to the second device to display the data on the second device.

Another aspect of the present disclosure provides a display control method applied to a second device. The method includes: determining a first position of a first device, when it is determined that the first device is located within a preset range of the second device and the first device is an associated device of the second device; and receiving data sent by the first device and displaying it based on a direct connection channel between the first device and the second device, when it is determined that the first position of the first device meets a condition.

Still another aspect of the present disclosure provides a second device. The second device includes a second sensor, a second processor and a display screen. The second sensor is configured to determine a first position of a first device. The second processor is configured to: determine the first position of the first device through the second sensor, when the first device is located within a preset range of the second device and the first device is an associated device of the second device; and receive data sent by the first device based on a direct connection channel between the first device and the second device, when it is determined that the first position of the first device meets a condition. The display screen is configured to display data received from the first device.

BRIEF DESCRIPTION OF THE DRAWINGS

In order to more clearly illustrate the technical solutions in the embodiments of the present disclosure or the prior art, a brief introduction to the drawings used in the description of the embodiments or the prior art will be provided below. It is evident that the drawings described below are merely some embodiments of the present disclosure, and those skilled in the art may obtain other drawings based on these drawings without creative effort.

FIG. 1 illustrates a flowchart of a display control method according to an embodiment of the present disclosure;

FIG. 2 illustrates a flowchart of another display control method according to an embodiment of the present disclosure;

FIG. 3 illustrates a flowchart of another display control method according to an embodiment of the present disclosure;

FIG. 4 illustrates a flowchart of another display control method according to an embodiment of the present disclosure;

FIG. 5 illustrates a schematic diagram of a second device receiving a plurality of data screen-projection requests, according to an embodiment of the present disclosure;

FIG. 6 illustrates a flowchart of a display control method according to an embodiment of the present disclosure;

FIG. 7 illustrates a flowchart of another display control method according to an embodiment of the present disclosure;

FIG. 8 illustrates a structural schematic diagram of a first device according to an embodiment of the present disclosure.

DETAILED DESCRIPTION

Figure 9:
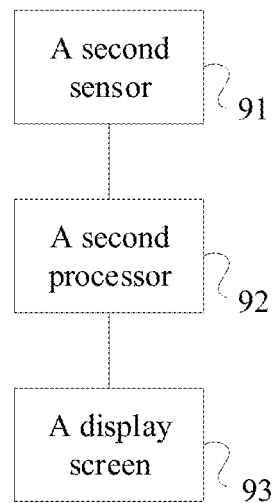
FIG. 9 illustrates a structural schematic diagram of a second device according to an embodiment of the present disclosure.

The technical solutions in the embodiments of the present disclosure will be described below with reference to the accompanying drawings in the embodiments of the present disclosure. Obviously, the described embodiments are only some of the embodiments of the present disclosure, rather than all of the embodiments. Based on the embodiments in the present disclosure, all other embodiments obtained by those of ordinary skill in the art without creative efforts fall within the scope of protection of the present disclosure.

The present disclosure provides a display control method applied to a first device. For example, FIG. 1 illustrates a flowchart of an exemplary display control method according to an embodiment of the present disclosure. The method includes:

Step S11: Determining a first position of the first device, when it is determined that a second device is located within a preset range of the first device and the second device is an associated device of the first device.

Step S12: Sending data of the first device to the second device based on a direct connection channel between the first device and the second device, so that the second device may display data sent by the first device, when the first position of the first device meets a condition.

Currently, in screen-projection scenarios, such as for a conference large screen, it is necessary to install and launch screen-projection software, then select the conference large screen as a screen-projection target. After receiving the screen-projection request, the conference large screen requires manual user confirmation to enable data projection on the large screen. When the screen-projection target is a regular display screen, a manual connection is also needed to achieve data projection on the screen.

Existing screen-projection solutions all require manual operations to achieve data projection, whereas in this solution, when certain condition is met, the first device automatically sends data to the second device, enabling the second device to display the data sent by the first device, realizing screen-projection without requiring manual user operations. This simplifies the operational process and improves the user experience.

The display control method disclosed herein is applied to the first device, where the first device is a device with data that needs to be projected for display. The second device is a device that displays data sent by other devices. The other devices may include the first device wirelessly connected to the second device, or a third device wirelessly connected to the second device, where the third device is not the first device.

As disclosed herein, the first, second, and/or third devices may include any suitable electronic devices including, but not limited to, servers, laptops, tablet computers, desktop computers, smart TVs, set-top boxes, mobile devices, such as mobile phones, portable video players, personal digital assistants, dedicated messaging devices, portable gaming devices.

The first device may detect whether there are other devices within a preset range. If it is determined that there are no other devices within the preset range of the first device, detection may continue until other devices are detected within the preset range of the first device.

The detection of whether there are other devices within the preset range of the first device may be realized through wireless sensing, such as Wi-Fi sensing, i.e., by detecting whether other devices exist within the preset range of the first device through Wi-Fi signals. Specifically, this may be detected by the wireless signal strength RSSI. The closer the distance between the two devices, the stronger the received signal strength; and the farther the distance between the two signals, the weaker the received signal strength. The value of the wireless signal strength RSSI may be obtained, and based on the size of this value, it may be determined whether a device is located within the preset range of the first device. Image sensors may also be used to collect images, and based on collected images, it may be determined whether there are other devices within the preset range of the first device.

When it is determined that the second device is located within the preset range of the first device, it is further determined whether the second device is an associated device of the first device. When the second device is not an associated device of the first device, the second device may be associated with the first device. When the second device is an associated device of the first device, a first position of the first device is determined, and it is judged whether the first position of the first device meets the condition.

Determining whether the first position of the first device meets the condition may include: determining whether the first position of the first device is in a specific location, such as a desktop; or determining whether the positional relationship between the first position of the first device and the second device meets a specific relationship, such as the absence of obstructions between the first device and the second device.

When the second device, associated with the first device, is located within the preset range of the first device and the first position of the first device meets the condition, the data of the first device is sent to the second device based on the direct connection channel between the first device and the second device, so that the second device may display the data sent by the first device.

The first device and the second device have a direct connection channel. Through direct connection channel, the data of the first device may be directly sent to the second device without going through a server. The direct connection channel enables direct data transmission from the first device to the second device, thereby improving data transmission efficiency.

The data sent from the first device to the second device may include video data, audio data, etc.

For audio data sent from the first device to the second device, two channels of PCM format data collected by a speaker and a microphone of the first device may be mixed to obtain a single channel of PCM data. The mixed PCM data may then be resampled to be fixed dual-channel PCM data with a sampling rate of 48K format. The resampled PCM data is packaged and sent to the second device.

For video data sent from the first device to the second device, original RGBA format video data collected by the first device may be compressed into a specific format, such as YUV420p. The specific format data may then be further encoded and compressed using an encoding algorithm such as H264, H265, MJPEG, or JPEG. The data compressed by the encoding algorithm is then encapsulated and packaged before being sent to the second device.

The first device first determines the data that needs to be sent to the second device. Specifically, when it is determined that the second device is located within the preset range of the first device, the second device is an associated device of the first device, and the first position of the first device meets the condition, the entire content displayed on the display screen of the first device is determined and sent to the second device, and the second device displays the entire content of the display screen of the first device on its own display screen.

Alternatively, the first device may determine a target application window on its display screen and send data corresponding to the target application window to the second device, so that the target application window displayed on the display screen of the first device may also be displayed on a display screen of the second device. The target application window may be a user-selected window or a currently active window.

Another option is to take a screenshot of a content displayed on the display screen of the first device and send the screenshot to the second device through the direct connection channel, so that the second device displays the screenshot of the content displayed on the display screen of the first device.

Regardless of which scenario applies to the data sent from the first device to the second device, the data of the first device needs to be sent to the second device in real-time through the direct connection channel between the first device and the second device to avoid interruptions or lag in the content displayed by the second device.

Once the first device sends the data to the second device, the second device displays the received data, enabling the data of the first device to be displayed on the second device, thereby achieving screen-projection without manual operation.

It should be noted that the direct connection channel between the first device and the second device may be established as follows. When the second device is determined to be located within the preset range of the first device and is confirmed to be an associated device of the first device, the direct connection channel between the first device and the second device is established based on the association relationship between the two devices. And when the first position of the first device is confirmed to meet the condition, the data of the first device is sent to the second device based on the established direct connection channel.

Alternatively, the direct connection channel between the first device and the second device may be established only when the second device is determined to be within the preset range of the first device, the second device is confirmed to be an associated device of the first device, and the first position of the first device is determined to meet the condition. Once the direct connection channel is established, the data of the first device is sent directly to the second device based on the direct connection channel, allowing the second device to display the data sent by the first device.

The direct connection channel between the first device and the second device may be established via Wi-Fi. Specifically, a wireless transceiver device (HDMI dongle) may be inserted into the second device, and the second device establishes a pairing and direct connection channel with the first device through the HDMI dongle.

The display control method as disclosed may be applied to office scenarios. For example, when a user carrying the first device enters an office, an external display screen, which serves as the second device, is placed on the user's desk. The first device and the second device are associated, meaning the second device is an associated device of the first device. As the user carrying the first device enters the office and the distance between the first device and the external display screen shortens until the external display screen is within the preset range of the first device, if it is detected that the first position of the first device meets the condition (e.g., the first device is placed on the desk), the data to be displayed on the first device is automatically sent to the external display screen, enabling the external display screen to display the data sent by the first device.

As disclosed, a display control method may be applied to the first device. When it is determined that the second device is located within the preset range of the first device, and the second device is an associated device of the first device, the first position of the first device is determined. When the first position of the first device meets the condition, the data of the first device is sent to the second device via the direct connection channel between the first device and the second device, allowing the second device to display the data sent by the first device. In this solution, as long as it is determined that the second device associated with the first device is located within the preset range of the first device and the first position of the first device meets the condition, the data of the first device is directly sent to the second device for display, thereby achieving automatic screen-projection without requiring manual operation. This improves the convenience of screen-projection and enhances the user experience.

Further, when sending the data of the first device to the second device, the display mode for the data from the first device may be determined. Based on the display mode for the data of the first device, a target display mode for displaying the data on the second device is determined, where the target display mode at least includes: mirroring mode and extended mode.

When the target display mode of the second device is mirroring mode, it is necessary to determine whether the first device has one display screen. When the first device has one display screen, data displayed on the second device will be the content displayed on the display screen of the first device. When the first device has a plurality of display screens, it is necessary to first determine a display mode of the plurality of display screens on the first device. When the display mode of the plurality of display screens on the first device is mirroring mode, the second device will directly display the same data as any one of the plurality of display screens on the first device. When it is determined that the display mode of the plurality of display screens on the first device is extended mode, a target display screen of the first device needs to be determined, and the second device will display the content shown on the target display screen of the first device.

When the target display mode of the second device is extended mode, it is necessary to determine how many display screens the first device has. When the first device has one display screen, relevant data may be directly selected from data displayed on the first device and sent to the second device, and the second device will extend and display the selected data from the first device. When the first device has a plurality of display screens, it is necessary to first determine the display mode of the plurality of display screens on the first device. When the display mode of the plurality of display screens on the first device is mirroring mode, the relevant data is selected from data displayed on any one of the plurality of display screens on the first device and sent to the second device, which will then extend and display the selected data from the first device. When the display mode of the plurality of display screens on the first device is extended mode, the target display screen of the first device must be determined, and the relevant data displayed on the target display screen is selected and sent to the second device, which will then extend and display the selected data from the target display screen of the first device.

Various embodiments provide a display control method applied to a first device. For example, FIG. 2 illustrates a flowchart of another exemplary display control method according to an embodiment of the present disclosure. The method includes:

Step S21: Determining a first position of the first device, when it is determined that a second device is located within a preset range of the first device and the second device is an associated device of the first device; and Step S22: Sending data of the first device to the second device based on a direct connection channel between the first device and the second device, thus allowing the second device to display the data sent by the first device, when the first position of the first device meets a condition and a target user matching the first device is detected.

When it is determined that the second device is located within the preset range of the first device, and the second device is an associated device of the first device, the first position of the first device is determined to meet the condition, and it is further determined whether the target user matching the first device may be detected.

When the first device detects the target user matching the first device, it indicates that the target user is present in the current environment. At this time, the data of the first device may be sent to the second device. When the first device fails to detect the target user matching the first device, it indicates that the target user is not present in the current environment, and there is no need to send the data of the first device to the second device or display the data of the first device on the second device. Only when the target user is present in the same environment as both the first device and the second device, will the data of the first device be displayed on the second device, thereby improving the display effect.

Therefore, it is necessary to further determine whether the target user matching the first device may be detected.

When the first device fails to detect the target user matching the first device, it is unnecessary to send the data of the first device to the second device. Specifically, when the first device is detecting the target user matching the first device and the direct connection channel between the first device and the second device has already been established, the direct connection channel between the first device and the second device may be closed when it is determined that the target user matching the first device cannot be detected. Alternatively, the direct connection channel between the first device and the second device may remain open, and the first device may continue to detect the target user matching the first device until the target user is detected and once the target user is detected, the data of the first device is sent to the second device based on the direct connection channel.

Additionally, it may be further determined whether a distance between the target user and the first device is less than a preset distance. When the distance between the target user and the first device is less than the preset distance, it indicates that the target user is close to the first device, and the data of the first device may be displayed on the second device.

Specifically, the distance between the first device and the target user may be detected using the wireless signal strength RSSI of Wi-Fi. The distance between the target user and the first device may be determined based on a variation in the wireless signal strength RSSI value. Alternatively, the distance between the target user and the first device may be detected using a distance sensor ToF. Additionally, the distance between the target user and the first device may be determined using an image capture device, which may be an internal component of the first device or an image capture device present in the current environment.

In an exemplary display control method, if the target user carries the first device into a conference room, and a conference large screen in the conference room is located within the preset range of the first device and the conference large screen is an associated device of the first device, when the target user places the first device on a table, the distance between the target user and the first device is determined. When the distance is close, the data from the first device is sent to the conference large screen in the conference room for display. If a non-target user carries the first device into the conference room, the conference large screen in the conference room is located within the preset range of the first device, the conference large screen is an associated device of the first device, and the first device is placed on the table, but at this time, either the target user is not detected or the distance between the target user and the first device is detected to be far, then the data from the first device will not be sent to the conference large screen in the conference room, and the conference large screen will not display the data of the first device, ensuring the security of the data on the first device.

A display control method may be applied to the first device. When it is determined that the second device is located within the preset range of the first device, and the second device is an associated device of the first device, the first position of the first device is determined. When the first position of the first device meets the condition and the target user matching the first device is detected, the data from the first device is sent to the second device based on the direct connection channel between the first and second devices, allowing the second device to display the data sent by the first device. In this solution, when it is determined that the second device associated with the first device is within the preset range of the first device, and the first position of the first device meets the condition, the data from the first device is directly sent to the second device once the target user matching the first device is detected, allowing the second device to display the data. This enables automatic screen-projection without requiring manual operation, improving the convenience of screen-projection and enhancing the user experience. Additionally, detecting the target user matching the first device ensures that the data from the first device is only sent to the second device when the target user is detected, thereby ensuring the security of the data on the first device.

Various embodiments of the present disclosure provide another exemplary display control method applied to a first device. For example, FIG. 3 illustrates a flowchart of another exemplary display control method according to an embodiment of the present disclosure. The method includes:

Step S31: Determining a first position of the first device, when it is determined that a second device is located within a preset range of the first device and the second device is an associated device of the first device;

Step S32: Determining whether the first device is in a target working state, when the first position of the first device meets a condition; and Step S33: Sending data of the first device to the second device based on a direct connection channel between the first device and the second device, thus allowing the second device to display data sent by the first device, when it is determined that the first device is in the target working state.

When it is determined that the second device is located within the preset range of the first device and the second device is an associated device of the first device, the first position of the first device is determined to meet the condition. Further, it is determined whether the first device is in the target working state. Only when the first device is in the target working state, will the data of the first device be sent to the second device based on the direct connection channel between the first device and the second device.

When it is determined that the first device is not in the target working state, there is no need to send the data of the first device to the second device. Specifically, when the first device is detecting its working state and the direct connection channel between the first device and the second device has already been established, the direct connection channel between the first device and the second device may be closed when it is determined that the first device is not in the target working state. Alternatively, the direct connection channel between the first device and the second device may remain open, and the working state of the first device may continue to be detected until the first device is determined to be in the target working state, once the first device is in the target working state, the data of the first device is sent to the second device based on the direct connection channel.

The target working state may include a physical state of the first device or a working state of a system of the first device.

The physical state of the first device may include an opening and closing angle state between two parts of an electronic device. For example, when the first device is a laptop or a foldable electronic device, it is determined that the first device is in the target working state when the opening angle between the two parts of the device reaches a certain angle. At this time, the data from the first device is sent to the second device based on the direct connection channel between the first device and the second device.

The working state of the system of the first device may include power-on state, standby state, shutdown state, etc. When the first device is in the power-on state or the standby state, it is determined that the first device is in the target working state. At this time, the data of the first device is sent to the second device based on the direct connection channel between the first device and the second device. When the first device is in the standby state, a current standby interface of the first device may be sent directly to the second device, allowing the second device to display the standby interface of the first device. Alternatively, when the first device is in the standby state, a password input interface for switching the first device from standby to normal operation may be sent to the second device, allowing the second device to display the password input interface when the first device switches from standby to normal operation.

The working state of the system of the first device may also be a login state of a specific application. When the specific application on the first device is in a logged-in state, it may be determined that the first device is in the target working state. At this time, the data of the first device is sent to the second device based on the direct connection channel between the first device and the second device. When the specific application on the first device is in a logged-in state, a main interface of that specific application may be sent to the second device based on the direct connection channel, allowing the second device to directly display the main interface of the specific application on the first device. Alternatively, a current interface of the specific application on the first device may be sent to the second device based on the direct connection channel, allowing the second device to directly display the current interface of the specific application on the first device.

A display control method may be applied to the first device. When it is determined that the second device is located within the preset range of the first device, and the second device is an associated device of the first device, the first position of the first device is determined. When the first position of the first device meets the condition, it is further determined whether the first device is in the target working state. When it is determined that the first device is in the target working state, the data of the first device is sent to the second device based on the direct connection channel between the first device and the second device, allowing the second device to display the data sent by the first device. In this solution, when it is determined that the second device associated with the first device is within the preset range of the first device, and the first position of the first device meets the condition, it is further determined whether the first device is in the target working state. Only when it is in the target working state is the data of the first device sent directly to the second device for display, thereby achieving automatic screen-projection without requiring manual operation. This enhances the convenience of screen-projection and improves the user experience. Additionally, by detecting the target working state of the first device, data is only sent to the second device when the first device is in the target working state, ensuring the security of the data on the first device.

Various embodiments of the present disclosure provide another exemplary display control method applied to a first device. For example, FIG. 4 illustrates a flowchart of another exemplary display control method according to an embodiment of the present disclosure. The method includes:

Step S41: Determining a first position of the first device, when it is determined that a second device is located within a preset range of the first device and the second device is an associated device of the first device;

Step S42: Outputting a data screen-projection request to the second device, when the first position of the first device meets a condition;

Step S43: Receiving a response result determined by the second device based on multiple data screen-projection requests received, where the second device receives data screen-projection requests sent from the first device and at least one third device and the second device determines whether to respond to the first device based on historical connection information and/or device priority; and Step S44: Sending data of the first device to the second device based on a direct connection channel between the first device and the second device, thus allowing the second device to display the data sent by the first device, when the response result indicates that the data screen-projection request sent from the first device is being responded to.

When it is determined that the second device is located within the preset range of the first device, and the second device is an associated device of the first device, the first position of the first device is determined to meet the condition. It is further determined whether to send the data of the first device to the second device based on the response result determined by the second device based on the multiple data screen-projection requests that the second device received.

When the first device exists in the environment, the second device is located within the preset range of the first device, the second device is an associated device of the first device, and the first position of the first device meets the condition; and additionally, at least one third device exist in the environment, and the second device is located within the preset range of the third device and is an associated device of the third device, and the third position of the third device meets the condition. In other words, at least two devices in the environment are capable of sending data to the second device so that the second device may display the data they send. To avoid confusion in the display when the second device simultaneously receives data from both the first device and the third device, it also requires outputting a data screen-projection request to the second device. The first device and the at least one third device must each output a data screen-projection request to the second device. Any device that meets the above conditions may output a data screen-projection request to the second device, allowing the second device to determine which device's data to receive and display.

For example, in a conference room, before a meeting begins, each participant carries a laptop into the conference room. The conference room may include Laptop 1, Laptop 2, Laptop 3, and so on. The conference room also includes a projection screen, which serves as a second device, as shown in FIG. 5. At this time, the projection screen is within the preset range of Laptop 1, Laptop 2, and Laptop 3, and the second device is an associated device of Laptop 1, Laptop 2, and Laptop 3. The positions of Laptop 1, Laptop 2, and Laptop 3 all meet the conditions. To determine which laptop's data the projection screen should display, Laptop 1, Laptop 2, and Laptop 3 must each send a data screen-projection request to the projection screen, allowing the projection screen to determine whether to receive and display the data sent by Laptop 1, Laptop 2, or Laptop 3.

When the second device receives the data screen-projection requests sent by the first device and the at least one third device, it may determine which device sent the data screen-projection request and query the historical connection information and/or device priority of the first device and the at least one third device stored in the second device. Based on the historical connection information and/or device priority of the first device and the at least one third device, it may then determine which device's data screen-projection request to respond to.

When determining which device's data screen-projection request to respond to based on the historical connection information, a connection frequency of the first device and a connection frequency of each of the at least one third device are queried. A device with a highest connection frequency is selected among the first device and the at least one third device, and the data screen-projection request from the device with the highest connection frequency is responded to. The historical connection information also includes a most recently connected device, and the data screen-projection request from the most recently connected device is responded to.

When determining which device's data screen-projection request to respond to based on device priority, device priority information is queried, and a device with a highest priority among the first device and the at least one third device is selected, and the data screen-projection request from the device with the highest priority is responded to.

When the second device responds to the data screen-projection request from the first device, it indicates that the second device may receive and display the data sent by the first device. The data of the first device is then sent to the second device based on the direct connection channel between the first device and the second device.

When the second device does not respond to the data screen-projection request from the first device, it indicates that the second device will not receive or display the data sent by the first device. In this case, the first device does not need to send data to the second device and may directly terminate the direct connection channel between the first device and the second device.

A display control method may be applied to the first device. When it is determined that the second device is located within the preset range of the first device, and the second device is an associated device of the first device, the first position of the first device is determined. When the first position of the first device meets the condition, a data screen-projection request is output to the second device. The first device receives the response result determined by the second device based on the multiple data screen-projection requests that the second device received. The second device receives data screen-projection requests from the first device and the at least one third device, and it determines whether to respond to the first device based on historical connection information and/or device priority. When the response result indicates that the data screen-projection request from the first device is being responded to, the data of the first device is sent to the second device based on the direct connection channel between the first device and the second device, allowing the second device to display the data sent by the first device.

In this solution, once it is determined that the second device associated with the first device is located within the preset range of the first device, and the first position of the first device meets the condition, the data of the first device is directly sent to the second device, allowing the second device to display the data. This enables automatic screen-projection without requiring manual operation, improving the convenience of screen-projection and enhancing the user experience. Additionally, it is further necessary to determine whether the second device will receive the data of the first device based on the response result of the second device to the data screen-projection requests. This avoids the problem of display confusion when the second device is within the preset range of multiple devices, the second device is an associated device of multiple different devices, and the positions of the multiple devices meet the condition.

Various embodiments of the present disclosure provide a display control method applied to a first device. For example, FIG. 6 illustrates a flowchart of a display control method according to an embodiment of the present disclosure. The method includes:

Step S61: Determining a first position of the first device, when it is determined that a second device is located within a preset range of the first device and the second device is an associated device of the first device;

Step S62: Sending data of the first device to the second device based on a direct connection channel between the first device and the second device, thus allowing the second device to display the data sent by the first device, when the first position of the first device meets a condition;

Step S63: Detecting a change in the first position of the first device; and

Step S64: Continuing to send the data of the first device to the second device when it is determined that the first position of the first device no longer meets the condition, but the second device is still within the preset range of the first device.

When the second device is located within the preset range of the first device, the second device is an associated device of the first device, and the first position of the first device meets the condition, the data of the first device is sent to the second device, allowing the second device to display the data sent by the first device. Only when all of these conditions are met, is the data of the first device sent to the second device, allowing the second device to display the data sent by the first device.

During a process of sending data from the first device to the second device and the second device displaying the data sent by the first device, the first position of the first device will continue to be monitored to determine whether the first position has changed.

When the first position has not changed, the first device continues to send data to the second device, allowing the second device to continuously display the data sent by the first device. When the first position has changed, it is necessary to determine whether a changed first position still meets the condition. When the changed first position meets the condition, the first device continues to send data to the second device, allowing the second device to continuously display the data sent by the first device; and when the changed first position no longer meets the condition, it is necessary to determine whether the second device is still within the preset range of the first device. When the second device is still within the preset range, the first device continues to send data to the second device, allowing the second device to continuously display the data sent by the first device. When it is determined that the changed first position no longer meets the condition and at this time the second device is outside the preset range of the first device, the first device stops sending data to the second device, causing the second device to stop displaying the data of the first device.

Alternatively, during the process of sending data from the first device to the second device and the second device displaying the data sent by the first device, it will continue to monitor whether the second device is still within the preset range of the first device. When the second device is still within the preset range of the first device, the first device continues to send data to the second device, allowing the second device to continuously display the data sent by the first device. When the second device is outside the preset range of the first device, the first position of the first device is monitored and if the first position of the first device still meets the condition, then the first device continues to send data to the second device, allowing the second device to continuously display the data sent by the first device.

When the second device is outside the preset range of the first device, the first position of the first device is monitored, and if the first position of the first device no longer meets the condition, the first device terminates sending data to the second device, causing the second device to stop displaying the data of the first device.

That is, during the process of the first device sending data to the second device and the second device displaying the data sent by the first device, the first device continuously sends data to the second device while also monitoring whether the second device remains within the preset range of the first device and whether the first position of the first device continues to meet the conditions. Only when both conditions are no longer met, does the first device stop sending data to the second device, causing the second device to stop displaying the data from the first device. When only one of these two conditions is not met, the first device continues sending data to the second device, allowing the second device to continue displaying the data from the first device.

Furthermore, determining whether the first position of the first device meets the condition may include: obtaining multiple sets of three-axis acceleration data continuously output by an acceleration sensor of the first device, and determining whether the first position of the first device meets the flat surface condition based on change information in the multiple sets of three-axis acceleration data.

Based on continuous multiple sets of three-axis acceleration data from the first device, it may be determined whether the first device is placed on a flat surface, that is, whether the first position of the first device meets a flat surface condition. When the first device is placed on a flat surface, a variation between the multiple sets of three-axis acceleration data would be smaller than a specific threshold. Thus, whether the variation is smaller than the specific threshold may determine whether the first device meets the flat surface condition. Meeting the flat surface condition indicates the first device is placed on a flat surface; not meeting the flat surface condition indicates the first device is not placed on a flat surface.

When there is a variation in the continuous multiple sets of three-axis acceleration data, but the variation is smaller than the specific threshold, it indicates the surface or the first device may have slightly shaken. In this case, it may still be determined that the first device meets the flat surface condition.

A display control method may be applied to the first device. When it is determined that the second device is within the preset range of the first device and the second device is an associated device of the first device, the first position of the first device is determined. When the first position of the first device meets the condition, the data of the first device is sent to the second device based on the direct connection channel between the first device and the second device, allowing the second device to display the data sent by the first device. The change in the first position of the first device is monitored. When the first position of the first device no longer meets the condition, but the second device remains within the preset range of the first device, the data of the first device continues to be sent to the second device.

In this solution, once it is determined that the second device associated with the first device is within the preset range of the first device and the first position of the first device meets the condition, the data of the first device is directly sent to the second device, allowing the second device to display the data. This enables automatic screen-projection without manual operation, improving the convenience of screen-projection and enhancing the user experience. Additionally, during the process of the second device displaying the data sent by the first device, the change in the first position of the first device is continuously monitored. When the first position changes such that the first position no longer meets the condition, but the second device remains within the preset range of the first device, the first device continues sending data to the second device, ensuring the stability of the data displayed by the second device.

Various embodiments of the present disclosure also provide a display control method applied to a second device. For example, FIG. 7 illustrates a flowchart of another exemplary display control method. The method includes:

Step S71: Determining, when it is determined that a first device is within a preset range of the second device and the first device is an associated device of the second device, a first position of the first device; and Step S72: Receiving data sent by the first device based on a direct connection channel between the first device and the second device and displaying the data, when it is determined that the first position of the first device meets a condition.

The display control method as disclosed may be applied to the second device, and the second device performs a detection process to determine whether to receive and display the data sent by the first device, thereby achieving automatic screen-projection display of the data from the first device.

The second device detects whether there are other devices within the preset range. When the first device is within the preset range of the second device, it is further determined whether the first device is an associated device of the second device. If the first device is an associated device, it is further determined whether the first position of the first device meets the condition. When the condition is met, the data sent by the first device based on the direct connection channel is received and displayed.

The detection of whether there are other devices within the preset range of the second device may be realized through Wi-Fi sensing, i.e., by detecting whether other devices exist within the preset range of the second device through Wi-Fi signals. Alternatively, image sensors may be used to collect images, and the images are analyzed to determine whether there are other devices within the preset range of the second device.

The first position of the first device may be detected by the second device through image collection by an image sensor. This image sensor may be an image sensor on the second device or an external image sensor. Specifically, the second device collects images of the location where the first device is situated using an image sensor, analyzes the collected images, and determines whether the first position of the first device meets the condition.

When it is determined that the first position of the first device meets the condition, the second device may receive the data sent by the first device based on the direct connection channel between the first device and the second device and display the data.

Specifically, when it is determined that the first device is within the preset range of the second device, the first device is an associated device of the second device, and the first position of the first device meets the condition, a direct connection channel between the first device and the second device is established. Once the direct connection channel is established, the data sent by the first device is directly received through the channel and displayed.

Alternatively, once it is determined that the first device is within the preset range of the second device and is an associated device of the second device, a direct connection channel between the first device and the second device is established. When the first position of the first device is determined to meet the condition, the data sent by the first device is received based on the direct connection channel and displayed.

Furthermore, when it is determined that the first position of the first device meets the condition, the data sent by the first device is received based on the direct connection channel between the first device and the second device and displayed.

Specifically, when it is determined that the first position of the first device meets the condition, data screen-projection requests sent by the first device and at least one third device are received. Based on historical connection information and/or device priority, it is determined whether to respond to the first device, and a response result is output so that the first device may determine whether to send data to the second device based on the response result.

When there are multiple associated devices within the preset range of the second device, the multiple associated devices may include the first device and at least one third device. When it is determined that the positions of the first device and the at least one third device meet the condition, each device among the first device and the at least one third device outputs a data screen-projection request to the second device.

When the second device receives data screen-projection requests from a plurality of devices, it determines which device's data screen-projection request to respond to based on historical connection information and/or device priority.

When determining which device's data screen-projection request to respond to based on the historical connection information, the second device queries a connection frequency of the first device and a connection frequency of each of the at least one third device in the historical connection information. The second device then selects a device with a highest connection frequency among the first device and the at least one third device and responds to that device's data screen-projection request. The historical connection information may also include information about the most recently connected device, in which case the second device responds to the data screen-projection request from the most recently connected device.

When determining which device's data screen-projection request to respond to based on device priority, the second device queries predefined priority information of the devices and selects the device with the highest priority among the first device and the at least one third device, responding to that device's data screen-projection request.

When the second device responds to the first device's data screen-projection request, this indicates that the second device may receive and display the information sent by the first device. The data of the first device is then sent to the second device based on the direct connection channel between the first device and the second device.

When the second device does not respond to the first device's data screen-projection request, this indicates that the second device will not receive or display the information sent by the first device. In this case, the first device does not need to send information to the second device and may directly terminate the direct connection channel between the first device and the second device.

The second device may detect changes in the position of the first device using an image capture sensor. When the first device no longer satisfies the flat surface condition but remains within the preset range of the second device, the second device will continue receiving and displaying the data sent by the first device. When the first device is no longer within the preset range, the second device will stop displaying the data sent by the first device.

The display control method disclosed herein is based on the display control method described in the previous embodiments and will not be repeated here.

A display control method may be applied to the second device. When it is determined that the first device is within the preset range of the second device and the first device is an associated device of the second device, the first position of the first device is determined. When it is determined that the first position of the first device meets the condition, the data sent by the first device is received and displayed based on the direct connection channel between the first device and the second device. In this solution, as long as the first device associated with the second device is within the preset range of the second device and the first position of the first device meets the condition, the data sent by the first device is directly received and displayed. This enables automatic screen-projection of the data from the first device to the second device without requiring manual operation, improving the convenience of data projection and enhancing the user experience.

Various embodiments of the present disclosure provide a first device. For example, FIG. 8 illustrates a structural schematic diagram of an exemplary first device according to an embodiment of the present disclosure. As shown, the first device includes a first sensor 81 and a first processor 82.

Where the first sensor 81 is used to determine a first position of the first device. The first processor 82 is used to determine, when a second device is within a preset range of the first device and is an associated device of the first device, the first position of the first device through a sensor. When the first position of the first device meets the condition, data of the first device is sent to the second device based on a direct connection channel between the first device and the second device, allowing the second device to display the data sent by the first device.

The first device is implemented based on the display control method described in the previous embodiments and will not be repeated here.

When it is determined that the second device is within the preset range of the first device and the second device is an associated device of the first device, the first position of the first device is determined. When the first position of the first device meets the condition, the data of the first device is sent to the second device based on the direct connection channel between the first device and the second device, allowing the second device to display the data sent by the first device. In this solution, as long as the second device associated with the first device is within the preset range of the first device and the first position of the first device meets the condition, the data of the first device is directly sent to the second device, allowing the second device to display the data. This enables automatic screen-projection without requiring manual operation, improving the convenience of data projection and enhancing the user experience.

Various embodiments of present disclosure provide a second device. For example, FIG. 9 illustrates a structural schematic diagram of an exemplary second device according to an embodiment of the present disclosure. As shown, the second device includes a second sensor 91, a second processor 92, and a display screen 93.

Where the second sensor 91 is used to determine a first position of a first device. The second processor 92 is used to determine, when the first device is within a preset range of the second device and is an associated device of the second device, the first position of the first device through the second sensor. When it is determined that the first position of the first device meets the condition, data sent by the first device is received based on a direct connection channel between the first device and the second device. The display screen 93 is used to display the data received from the first device.

The second device as disclosed is implemented based on the display control method described in the previous embodiments and will not be repeated here.

When it is determined that the first device is within the preset range of the second device and the first device is an associated device of the second device, the first position of the first device is determined. When it is determined that the first position of the first device meets the condition, the data sent by the first device is received and displayed through the direct connection channel between the first device and the second device. In this solution, as long as the first device associated with the second device is within the preset range of the second device and the first position of the first device meets the condition, the data sent by the first device is directly received and displayed by the second device, enabling automatic screen-projection of the data from the first device to the second device without requiring manual operation, improving the convenience of data projection and enhancing the user experience.

The embodiments described in this specification are described in a progressive manner, with each embodiment focusing on the differences from other embodiments. The similar or identical parts between the various embodiments are referenced to each other. The device disclosed in the embodiments corresponds to the method disclosed in the embodiments, so the description is relatively simple, and reference can be made to the method description for relevant details.

One of ordinary skilled in the art will further appreciate that the units and algorithm steps of the various examples described in the disclosed embodiments may be implemented in electronic hardware, computer software, or a combination of both. To clearly illustrate the interchangeability of hardware and software, the components and steps of the various examples have been generally described in terms of their functions. Whether these functions are performed by hardware or software depends on the specific application and design constraints of the technical solution. One of ordinary skilled in the art may use different methods to implement the described functions for each specific application, but such implementation should not be considered outside the scope of the present disclosure.

The steps of the methods or algorithms described in conjunction with the disclosed embodiments may be implemented directly in hardware, in a processor-executed software module, or in a combination of both. The software module may reside in random access memory (RAM), memory, read-only memory (ROM), electrically programmable ROM (EPROM), electrically erasable programmable ROM (EEPROM), registers, hard disks, removable disks, CD-ROMs, or any other form of storage medium known in the art.

The above description of the disclosed embodiments enables those skilled in the art to realize or use this disclosure. Various modifications to these embodiments will be readily apparent to those skilled in the art, and the general principles defined herein may be applied to other embodiments without departing from the spirit or scope of this disclosure. Therefore, this disclosure is not limited to the embodiments shown herein but is to be accorded the widest scope consistent with the principles and novel features disclosed.

What is claimed is:

1. A display control method applied to a first device, comprising:

determining a first position of the first device, when it is determined that a second device is located within a preset range of the first device and the second device is an associated device of the first device; and sending, when the first position of the first device meets a condition and based on a direct connection channel between the first device and the second device, data of the first device to the second device to display the data on the second device.

2. The method according to claim 1, wherein sending the data of the first device to the second device comprises:

sending the data of the first device to the second device based on the direct connection channel between the first device and the second device, when the first position of the first device meets the condition and a target user matching the first device is detected.

3. The method according to claim 1, wherein sending the data of the first device to the second device comprises:

determining whether the first device is in a target working state, when the first position of the first device meets the condition; and sending the data of the first device to the second device based on the direct connection channel between the first device and the second device, when it is determined that the first device is in the target working state.

4. The method according to claim 1, wherein sending the data of the first device to the second device comprises:

outputting a data screen-projection request to the second device, when the first position of the first device meets the condition;

receiving a response result determined by the second device based on a plurality of data screen-projection requests that are received, wherein the second device receives data screen-projection requests sent by the first device and at least one third device, respectively; and the second device determines whether to respond to the first device based on historical connection information and/or device priority; and sending the data of the first device to the second device based on the direct connection channel between the first device and the second device, when the response result indicates to respond to the data screen-projection request of the first device.

5. The method according to claim 4, wherein the second device is further configured to perform:

querying a connection frequency of the first device and a connection frequency of each of the at least one third device in historical connection information, selecting a device with a highest connection frequency among the first device and the at least one third device; and responding to a data screen-projection request from the device with a highest connection frequency, wherein the historical connection information comprises information about a most recently connected device, and the second device responds to a data screen-projection request from the most recently connected device.

6. The method according to claim 4, wherein the second device is further configured to perform:

querying predefined priority information of the first device and the at least one third device;

selecting a device with a highest priority among the first device and the at least one third device; and responding to a data screen-projection request sent by the device with the highest priority.

7. The method according to claim 1, wherein determining whether the first position of the first device meets the condition, comprises:

obtaining multiple sets of three-axis acceleration data continuously output by an acceleration sensor of the first device; and determining whether the first position of the first device meets a flat surface condition based on change information in the multiple sets of three-axis acceleration data.

8. The method according to claim 1, further comprising:

detecting a change in the first position of the first device; and continuing to send the data of the first device to the second device, when it is determined that the first position of the first device no longer meets the condition and the second device is still located within the preset range of the first device, wherein the second device continues to display the data sent from the first device.

9. The method according to claim 1, further comprising:

detecting a change in the first position of the first device; and terminating sending the data of the first device to the second device, when it is determined that the first position of the first device no longer meets the condition and the second device is located outside the preset range of the first device, wherein the second device stops displaying the data of the first device.

10. An electronic device, used as a first device, comprising:

a first sensor, configured to determine a first position of the first device; and a first processor, configured to:

determine the first position of the first device through the first sensor, when it is determined that a second device is located within a preset range of the first device and the second device is an associated device of the first device; and send, when the first position of the first device meets a condition and based on a direct connection channel between the first device and the second device, data of the first device to the second device to display the data on the second device.

11. The device according to claim 10, wherein the first processor is further configured to send the data of the first device to the second device based on the direct connection channel between the first device and the second device, when the first position of the first device meets the condition and a target user matching the first device is detected.

12. The device according to claim 10, wherein the first processor is further configured to:

determine whether the first device is in a target working state, when the first position of the first device meets the condition; and send the data of the first device to the second device based on the direct connection channel between the first device and the second device, when it is determined that the first device is in the target working state.

13. The device according to claim 10, wherein the first processor is further configured to:

output a data screen-projection request to the second device, when the first position of the first device meets the condition;

receive a response result determined by the second device based on a plurality of data screen-projection requests that are received, wherein the second device receives data screen-projection requests sent by the first device and at least one third device, respectively; and the second device determines whether to respond to the first device based on historical connection information and/or device priority; and send the data of the first device to the second device based on the direct connection channel between the first device and the second device, when the response result indicates to respond to the data screen-projection request of the first device.

14. The device according to claim 13, wherein the second device is further configured to:

query a connection frequency of the first device and a connection frequency of each of the at least one third device in historical connection information, select a device with a highest connection frequency among the first device and the at least one third device; and respond to a data screen-projection request from the device with a highest connection frequency, wherein the historical connection information comprises information about a most recently connected device, and the second device is configured to respond to a data screen-projection request from the most recently connected device.

15. The method according to claim 13, wherein the second device is further configured to:

query predefined priority information of the first device and the at least one third device;

select a device with a highest priority among the first device and the at least one third device; and respond to a data screen-projection request sent by the device with the highest priority.

16. The device according to claim 10, wherein the first processor is further configured to:
- obtain multiple sets of three-axis acceleration data continuously output by an acceleration sensor of the first device; and
- determine whether the first position of the first device meets a flat surface condition based on change information in the multiple sets of three-axis acceleration data.

17. The device according to claim 10, wherein the first processor is further configured to:
- detect a change in the first position of the first device; and
- continue to send the data of the first device to the second device, when it is determined that the first position of the first device no longer meets the condition and the second device is still located within the preset range of the first device, so that the second device continues to display the data sent by the first device.

18. The device according to claim 10, wherein the first processor is further configured to:
- detect a change in the first position of the first device; and
- terminate sending the data of the first device to the second device, when it is determined that the first position of the first device no longer meets the condition and the second device is located outside the preset range of the first device, so that the second device stops displaying the data of the first device.

* * * * *